United States Patent [19]

Burson

[11] 4,012,651
[45] Mar. 15, 1977

[54] PERMANENT MAGNET FIELD MEANS FOR DYNAMO-ELECTRIC MACHINES

[75] Inventor: Bob O. Burson, East Longmeadow, Mass.

[73] Assignee: R. E. Phelon Company, Inc., East Longmeadow, Mass.

[22] Filed: Dec. 20, 1974

[21] Appl. No.: 534,856

[52] U.S. Cl. .............................. 310/153; 310/70 R; 310/156; 310/67 R
[51] Int. Cl.² ........................................ H02K 21/22
[58] Field of Search ............... 310/42, 43, 152–156, 310/67, 70, 70 A

[56] References Cited
UNITED STATES PATENTS

| 3,368,275 | 2/1968 | Eberline et al. | 310/153 X |
| 3,500,090 | 3/1970 | Baermann | 310/154 |
| 3,663,850 | 5/1972 | Phelon | 310/42 X |
| 3,828,212 | 8/1974 | Harkness et al. | 310/153 |

Primary Examiner—Donovan F. Duggan
Attorney, Agent, or Firm—McCormick, Paulding & Huber

[57] ABSTRACT

A permanent magnet field means for use in a dynamo-electric machine comprises a magnet ring received in a supporting ring of ferromagnetic material. The magnet ring includes a circular array of arcuate magnets and a carrier of non-magnetic material in which the magnets are fixedly embedded. The magnet ring has a single axially extending gap located between the adjacent ends of two neighboring magnets. A spreading element placed in the gap spreads the magnet ring into tight engagement with the supporting ring. In some cases, this expansion of the magnet ring is used by itself to hold the magnet ring to the supporting ring in the finished device. In other cases, an adhesive is used between the supporting ring and the magnet ring and the expansion of the magnet ring is used to hold the magnet ring tightly to the supporting ring until the adhesive sets, the adhesive thereafter being the principal agent fixing the magnet ring to the supporting ring.

6 Claims, 18 Drawing Figures

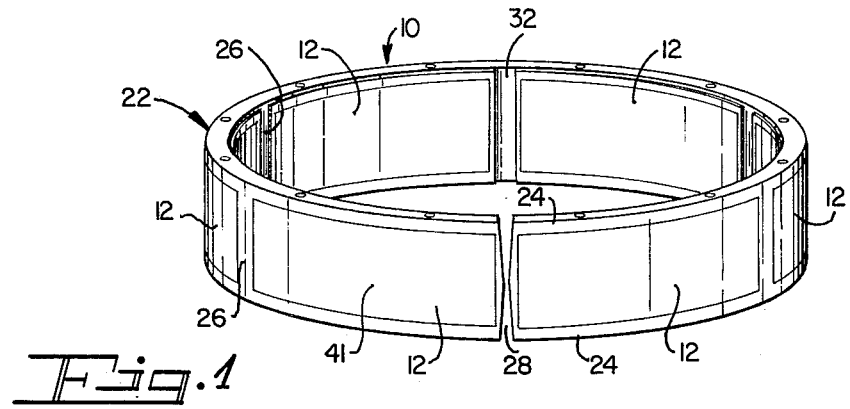
Fig. 1
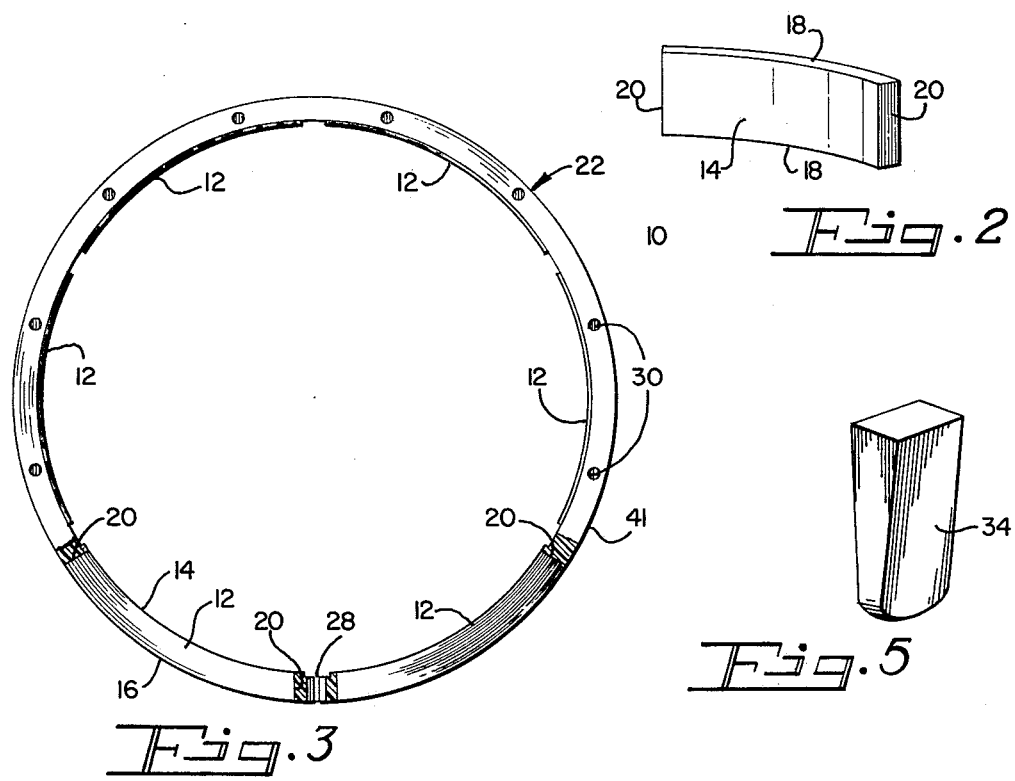
Fig. 2
Fig. 3
Fig. 5
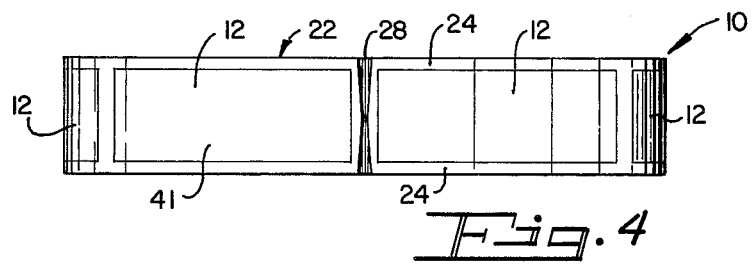
Fig. 4

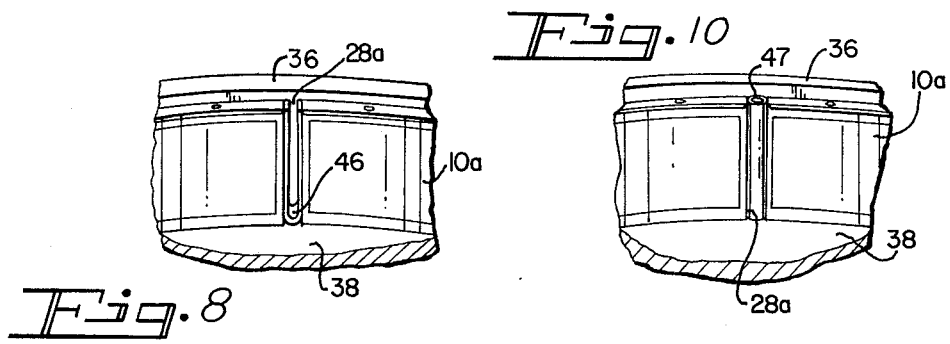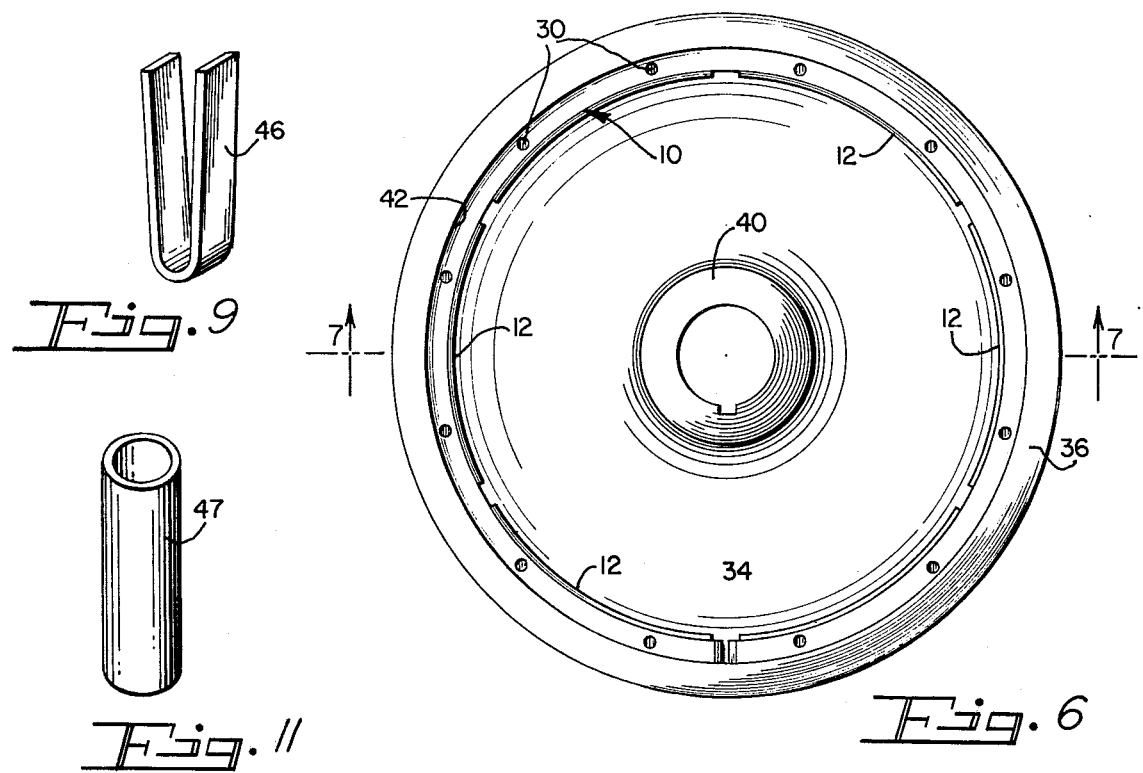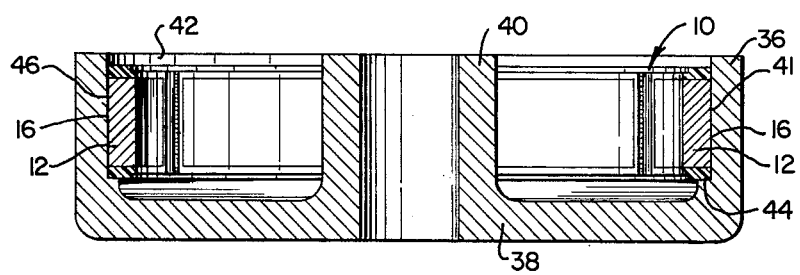

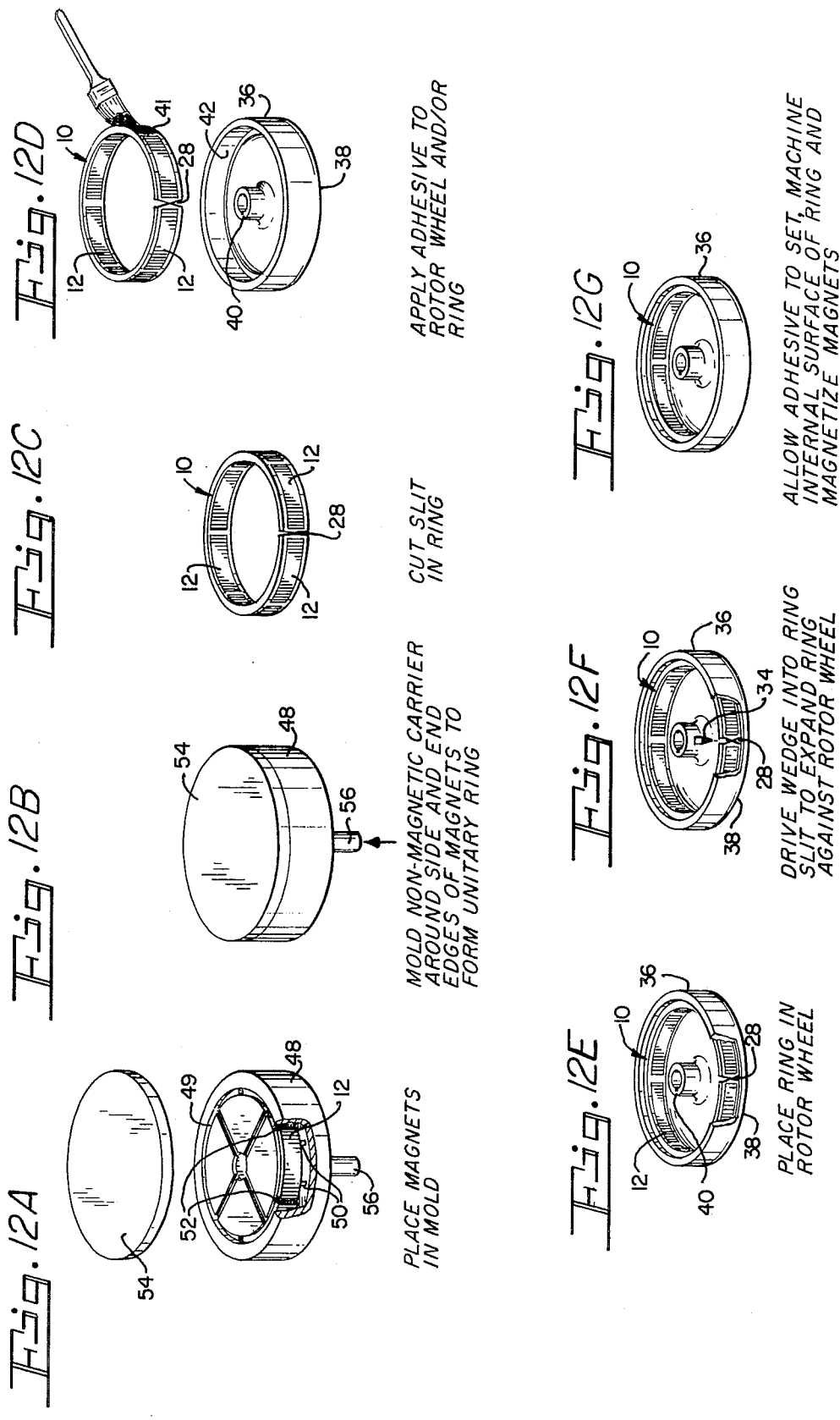

PERMANENT MAGNET FIELD MEANS FOR DYNAMO-ELECTRIC MACHINES

BACKGROUND OF THE INVENTION

The invention relates to an annular permanent magnet field means having circumaxially spaced and inwardly facing pole faces for use in a permanent magnet dynamo-electric machine, to a sub-assembly of magnets used in the fabrication of such a field means, and to a process for making such a field means. More specifically, this invention concerns a dynamoelectric machine field means, and a related sub-assembly and process, of the type having a plurality of magnets arranged in a circular array and fixed to the inner surface of a supporting ring made of ferromagnetic material.

The field means of this invention may be used in either a motor or a generator and may be either a stationary or a rotating part. However, it lends itself particularly well to generators of the type having a rotating field provided by a rotor in the form of a flywheel or other wheel having a rim with magnets on the interior surface thereof, and the invention is, therefore, hereinafter shown and described as applied to such a rotor.

In assembling a permanent magnet field means comprised of a number of magnets in a supporting ring, a manufacturer faces a number of problems. One of these is that of locating the magnets in proper angular relationship with respect to each other. An angular shift of only a few degrees in one of the magnets can markedly decrease the efficiency of the motor or generator in which the field means is used. A second problem involves the fact that the supporting ring is conventionally made of iron and forms part of the flux paths for the magnets. Thus, the magnets should be in close association with the wheel to eliminate high reluctance gaps between the magnets and the wheel and this is sometimes difficult to achieve. A third problem is that manual placement of the magnets in the wheel is expensive. Another problem relates specifically to ceramic magnets, which is the type of magnet usually preferred in the type of field means to which the invention pertains. These magnets are quite brittle, and must be handled with care to avoid cracking, chipping and other damage.

Some of the objects of the present invention are, therefore, to produce an annular permanent magnet field means in which the magnets are accurately located and wherein such accuracy is easily and inexpensively achieved, to produce such a field means in which a high degree of closeness between the magnets and the supporting ring is obtained, and to produce such a field means which may be made with only a small amount of hand labor, as by using a sub-assembly of magnets in the form of a unitary ring which may, if desired, be made on an automatic or semi-automatic assembly machine. A further object is to provide a method of assemblying a field means of the foregoing character whereby the likelihood of accidental magnet damage during assembly is reduced.

In U.S. Pat. No. 3,390,291, a continuous annular magnet ring or sub-assembly consisting of a cluster of magnets and shoes embedded in a continuous carrier of non-magnetic material is held inside a supporting ring which may be part of a flywheel, ring gear or the like, by means of pressure between the magnet ring and the supporting ring. The pressure is obtained by heat shrinking the supporting ring onto the magnet ring. The magnet ring could alternatively be held in place by an adhesive between it and the supporting ring. In either case, however, it is necessary that both the inside diameter of the supporting ring and the outside diameter of the magnet ring be held to close dimensional tolerances to assure a close low reluctance fit between the magnets and the supporting ring. This in turn generally requires that the outer surface of the magnet ring and the inner surface of the supporting ring both be accurately machined prior to assembly of the magnet ring with the supporting ring. In U.S. Pat. No. 3,663,850 and U.S. Pat. No. 3,091,713, various structures are shown for holding arcuate ceramic magnets or the like to the inner surface of a supporting ring. In both of the latter disclosures, resiliently deformable members placed between the ends of the magnets urge the magnets circumferentially apart to cause them to press tightly against the supporting ring. In these devices, however, the magnets and deformable members are somewhat difficult to assemble.

SUMMARY OF THE INVENTION

The invention resides in a field means for a permanent magnet machine, which field means includes a supporting ring of ferromagnetic material and an associated annular magnet ring comprises of a plurality of ceramic magnets or the like embedded in a non-magnetic magnet carrier. The magnet ring is circumferentially continuous except for one axially and radially extending gap therein. The material of the carrier is one, such as polypropylene, which is generally incompressible yet sufficiently flexible in the bending mode as to allow spreading of the gap to a slight extent. A spreading element in the gap holds the gap defining ends of the magnet ring at such a spacing from one another as to cause the outer surface of the magnet ring to press tightly against the inner surface of the supporting ring. This pressure, an adhesive, or both is used to hold the magnets in the supporting ring. When an adhesive is employed, the pressure induced by the spreading element holds the magnets tightly against the supporting ring while the adhesive sets to form a permanent bond.

The invention also resides in the construction of the magnet ring used as part of the aforesaid field means and in the method for making the magnet ring and field means. As to method aspects of the invention, an annular arrangement of magnets having convex arcuate outer surfaces and concave arcuate inner surfaces is first assembled in a suitable mold. A carrier of non-magnetic material is then cast about the assembled magnets, the mold used being designed so that the cast material engages and supports the sides and ends of the magnets, but not their inner or outer arcuate surfaces. The cast material forms the magnets into a unitary ring. A single gap is formed in the ring either as part of the casting step or by a separate slitting step following the casting, the gap being located between the adjacent ends of two neighboring magnets. The cast material or carrier does not extend radially outwardly beyond the curved outer surface of the magnets. The magnet ring is then placed in a supporting ring, either with or without adhesive first being applied to one or both of the parts, and a wedge, spring or other spreading element is inserted into the magnet ring gap to circumferentially expand the magnet ring into tight engagement with the supporting ring. After the adhesive, if any, sets the internal surface of the magnet ring may be machined, if necessary, and the magnets magnetized to complete the field means.

BRIEF DESCRIPTION OF THE DRAWINGS

FIG. 1 is a perspective view of the magnet ring embodying one aspect of the invention.

FIG. 2 is a perspective view of a ceramic magnet of the type used in the magnet ring of FIG. 1.

FIG. 3 is a top view of the magnet ring of FIG. 1.

FIG. 4 is a front elevational view of the magnet ring of FIG. 1.

FIG. 5 is an enlarged scale perspective view of the wedge used as a spreading element to expand the magnet ring of FIG. 1.

FIG. 6 is a top view of the magnet ring of FIG. 1 disposed in a supporting ring.

FIG. 7 is a sectional view taken along the line 7—7 of FIG. 6, and

FIG. 8 is a fragmentary perspective view of a magnet ring, disposed in a supporting ring, comprising an alternate embodiment of this invention.

FIG. 9 is an enlarged scale perspective view of the spring used as a spreading element to expand the magnet ring of FIG. 8.

FIg. 10 is a fragmentary perspective view of a magnet ring disposed in a supporting ring, comprising still another alternative embodiment of this invention.

FIG. 11 is an enlarged scale perspective view of the tubular deformable member used as a spreading element to expand the magnet ring of FIG. 10.

FIGS. 12A through 12G show the various steps involved in the process for making a permanent magnet field means in accordance with this invention.

DETAILED DESCRIPTION OF PREFERRED EMBODIMENTS

Referring first to FIGS 1, 3 and 4, these figures illustrate a magnet ring, indicated generally at 10, embodying one aspect of this invention and which may be used in the making of a permanent magnet field means for a flywheel alternator or other dynamo-electric machine. The illustrated ring 10 has six arcuate magnets 12, 12 arranged in a circular array in spaced ene-to-end relationship. This number of magnets is not however critical to the invention and any other number of magnets may be used, as required by the application, without departing from the invention.

One magnet 12 of the magnet ring 10 is shown in FIG. 2, and from this figure taken in conjunction with FIG. 3, it will be noted that each magnet 12 is of a generally conventional elongated arcuate shape including an inwardly facing concave surface or face 14 and an outwardly facing convex arcuate surface or face 16, the surfaces 14 and 16 being concentric relative to a given axis of curvature. Also, each magnet 12 has two side walls 18, 18 located respectively in two parallel planes perpendicular to the axis of curvature and two end faces 20, 20 located respectively in planes radial to the axis of curvature.

The six magnets 12, 12 of the magnet ring 10 are held in assembly with one another by a carrier, indicated generally at 22, made of non-magnetic material. The magnets 12, 12 are essentially embedded in the material of the carrier 22, but all of the carrier material is located between the imaginary cylinder common to the concave inner magnet surfaces 14, 14 and the imaginary cylinder common to the convex outer magnet surfaces 16, 16 thereby leaving all of the arcuate magnet surfaces 14, 14 and 16, 16 exposed and uncovered by the carrier material. The side edges 18, 18 and end edges 20, 20 of the magnets are, however, covered by the carrier material. Accordingly, with this arrangement of the carrier material, it will be seen that the carrier consists of two annular side rings 24, 24 located adjacent opposite sides of the circular array of magnets and a plurality of axially extending ribs 26, 26 each located between an adjacent pair of magnet end faces 20, 20 the ribs 26, 26 connecting the two side rings 24, 24 to each other.

The carrier 22 in combination with the magnets 12, 12 forms a self-sustaining unitary member, the ring 10, which is continuous along its circumference except for a single axially extending gap 28 therein passing completely through the ring and extending along the length of one of the carrier ribs 26, 26 so as to form two circumferentially spaced apart ring ends.

As explained hereinafter, the gap 28 serves to receive a spreading element in the form of a wedge for circumferentially expanding the ring 10 to bring the magnets 12, 12 into tight engagement with a surrounding supporting ring. To allow such wedge to be driven into the gap 28 from either side of the ring 10, the gap 28 preferably is of a double wedge shape as shown in FIGS. 1 and 4. That is, the gap has a minimum circumferential width at a point near the axial middle of the ring and increases in width with distance in both axial direction away from the axial center of the ring.

Various suitable materials may be used for the carrier 22, but preferably the material chosen is one which is relatively incompressible and yet which is sufficiently flexible in the bending mode so as to allow easy spreading of the gap 28 when a wedge is driven therein. One suitable material is, for example, polypropylene. The magnets 12, 12 are preferably made of any one of a number of well known ceramic materials, but the invention is not necessarily limited to this and various other different magnet materials may be used if described.

Before leaving FIGS. 1 – 4, it should perhaps be noted that the magnet ring 10 is preferably made by first arranging an array of magnets 12, 12 in a suitable mold having elements for properly locating the magnets relative to one another, and then casting the carrier material around the magnets through the use of the mold. The magnet ring 10 is seen in FIGS. 1 and 3, shows traces of the elements used to locate the magnets in the mold prior to the casting of the carrier material. These traces consist of a series of holes 30, 30 passing through the upper side ring 24 of the carrier, there being two holes 30, 30 for each magnet. These holes were formed by pins in the mold, as shown in FIG. 12A and discussed hereinafter, for holding the magnets at a uniform height in the mold. Other traces are a series of axially extending grooves 32, 32 on the inner surfaces of the ring and at the location of each of the carrier ribs 26, 26. These grooves 32, 32 were in turn formed by ribs in the mold fitting between the adjacent ends of the magnets placed in the mold to properly angularly space and locate the magnets relative to one another.

FIG. 5 is an enlarged perspective view of a wedge 34 designed to be driven into the gap 28 of the magnet ring of FIG. 1 to circumferentially expand the latter during its assembly with a supporting ring. FIGS. 6 and 7 in turn show the magnet ring 10 of FIG. 1 in combination with a supporting ring and a wedge 34 to form a completed permanent magnet field means. The supporting ring with which the magnet ring is used is of a ferromagnetic material so as to serve as a low reluctance conductor for the flux of the magnets of the magnet ring. Except for this constraint on the type of material used for the supporting ring, the supporting ring may take various different forms and may be a part of various different types of dynamoelectric machines. In FIGS. 6 and 7, by way of example, the supporting ring is shown to constitute the rim 36 of a rotor wheel 38. The rotor wheel 38 also includes a hub 40 adapted for attachment to a rotatable shaft, such as the crankshaft of an internal combustion engine, and the space between the hub 40 and the magnet ring 10 serves to receive the stator assembly (not shown) for which the magnet ring 10 serves as a rotating field means. The rim 36 includes a radially inwardly facing circumferential surface or face 42 against which the outer convex faces 16, 16 of the magnets 12, 12 bear. A shoulder 44 at the inner end of the cylindrical surface 42 engages one side of the magnet ring 10 to axially locate it relative to the rotor wheel 38.

The magnet ring 10 may, if desired, be secured to the supporting ring or rim 36 solely by the wedging or arch effect produced by the driving of the wedge 34 into the magnet ring gap. However, an adhesive 46 is generally preferably used between the outer surface 41 of the magnet ring and the inwardly facing surface 42 of the rim 36 to bond the magnets to the rim. In this event, the wedge 34 serves primarily to hold the magnets in tight engagement with the rim 36 during the time that the adhesive sets and thereafter the adhesive serves most likely as the principal agent for securing the magnets to the rim. The fact that the wedge does not hold the magnets in tight engagement with the rim 36 during the setting of the adhesive assures that the film of adhesive between the magnets and the rim will be very thin and that a low reluctance joint between the magnets and the rim will be obtained.

The wedge 34, previously described in connection with FIGS. 1 – 6 is only one of many different spreading elements which may be used, without departing from the invention, to exert a spreading force between the walls of a gap in a magnet ring generally similar to the ring 10 previously described. For example, different forms or shapes of wedge elements may be used in place of the specifically illustrated wedge 34, with the walls of the gap 28 being suitably modified, if necessary, to suit the particular wedge chosen. Also, the spreading element may constitute a resiliently deformable spring member inserted in the gap and designed to be held by the walls of the gap in a resiliently deformed condition so as to exert gap spreading spring forces on the walls. Or, the spreading element may constitute a plastically deformable member inserted in the gap and subsequently plastically deformed to increase its dimension circumferentially of the ring. By way of example, FIGS. 8 and 9 show a spring member used as the spreading element, and FIGS. 10 and 11 shows a deformable insert used as the spreading element.

Referring to FIGS. 8 and 9, FIG. 8 shows a magnet ring 10a received within the rim 36 of a rotor wheel 38. The ring 10a is similar to the previously described ring 10 except for its single gap 28a having generally parallel straight side walls rather than the double wedge-shaped side walls of the gap 28 of the magnet ring 10. Received in the gap 28a is a U-shaped spring 46, such as shown in FIG. 9. Prior to insertion in the gap 28a, the spring 46 has, in its relaxed state, a dimension, between the outer faces of its two legs, greater than the spacing between the walls of the gap 28a so that after the spring is inserted in the gap 28a, the legs of the spring are held in a resiliently deformed state so as to exert a resilient biasing force against the walls of the gap tending to spread the gap and thereby urging the ring into tight engagement with the rim 36.

Referring to FIGS. 10 and 11, these figures show a magnet ring 10a, similar to that of FIG. 8, received in a rim 36 of a rotor wheel 38 and having a plastically deformable tubular spreading element 47 received in the gap 28a. The tubular member 47, as shown in FIG. 11, is initially of a generally circular cross section with an outside diameter closely similar to the spacing between the walls of the gap 28a so that the member 47 may be easily placed in the gap 28a. After the member 47 is placed in the gap, it is deformed by pressing a tool against it in a radially outward direction so as to squeeze the member between the tool and the rim 36, thereby deforming the member into a generally oval shape and increasing its dimension circumferentially of the magnet ring so as to force it against the walls of the gap 28a, thereby exerting a spreading force on the walls of the gap and expanding the ring into tight engagement with the rim 36.

Having now described the construction of both a magnet ring embodying this invention and of a field means made from such a magnet ring, the making of both a magnet ring and a field means in accordance with the process of this invention may be described with reference to FIGS. 12A to 12G, which show in sequence the various steps of the process. In this description of the process, the spreading element is taken to be a wedge, such as the wedge 34 of FIG. 5, and the magnet ring is accordingly one, such as the previously described ring 10, having a double wedge-shaped gap 28 for receiving the wedge from either side of the ring.

Starting with FIG. 12A, the correct number of magnets, six in the illustrated case, are first arranged in one part 48 of a mold having elements for properly locating the magnets relative to one another while nevertheless allowing the carrier material during casting to flow around the magnets to form the desired carrier shape. These locating elements include an annular recess 49 in the mold part 48 which receives the magnets 12, 12. At the bottom of the recess are two locating pins 50, 50 for each magnet which support the magnet at a desired height. These pins 50, 50 form the holes 30, 30 previously referred to in connection with FIG. 2. Also, as part of the magnet locating means, the mold 48 includes ribs 52, 52 which fit between the end faces of the magnets to angularly locate the magnets relative to one another. These ribs 52, 52 form the grooves 32, 32 of FIG. 2. After the magnets 12, 12 are placed in the mold part 48, another mold part 54 is closed on the part 48 and material to form the carrier is injected into the mold through the inlet 56, as indicated in FIG. 12B. It will, of course, be understood that the mold is shaped to cast the injected material into the shape desired for the carrier.

This casting of the carrier material around the magnets forms the magnets and the carrier material into a unitary ring. The mold may include features for forming the gap 28 in the ring, but in the event such gap is not formed in the molding process, the next step, as shown by FIG. 12C, is to slit the ring at one location to form the gap 28. This completes the formation of the magnet ring 10 which can now be easily transported to another location for assembly with a supporting ring and which is of such a character that the assembly with the supporting ring is easily accomplished with little tooling or labor being required.

FIGS. 12D to 12G specifically relate to the steps employed in assembling the finished magnet ring 10 of FIG. 12C with a supporting ring, the illustrated supporting ring being the rim 36 of the rotor wheel 38, as in FIGS. 5 and 7.

If an adhesive is to be used to bond the magnets of the magnet ring to the supporting ring 36, the adhesive is first applied in a liquid state to either the outer cylindrical face 41 of the magnet ring or to the inner cylindrical face 42 of the rim, or to both such faces. This may be done manually with a paint brush, as shown in FIG. 12D, or by any other convenient method.

The magnet ring 10 is next placed within the rotor wheel 38, as shown in FIG. 12E. At this point, it should be noted that because of the double wedge shape of the gap 28 in the ring, the ring may be placed in the rotor wheel with either one of its two sides facing outwardly. Accordingly, the worker making the assembly need not take any special care in deciding in which of its two possible ways the magnet ring is to be placed in the rotor wheel. After the ring is in the rotor wheel, a wedge, such as the one shown at 34 in FIG. 5, is driven into the gap 28 from the open side of the wheel to circumferentially expand the ring into tight engagement with the rim 36, as illustrated by FIG. 12F.

If an adhesive is used, it is now allowed to set. After the setting of the adhesive, or after the driving of the wedge if no adhesive is used, the internal surface of the magnet ring may, if necessary, be machined to bring it to a desired concentricity and diameter. Thereafter the magnets 12, 12 are magnetized, as is conventional, as indicated in FIG. 12G. The step of FIG. 12G completes the formation of the field means and thereafter it and the rotor wheel of which it is a part may be assembled with a suitable stator assembly to form a complete dynamo-electric machine.

I claim:

1. A unitary self-sustaining magnet ring for use in a dynamo-electric machine and adapted to being secured to a surrounding supporting ring, said magnet ring comprising a non-magnetic annular carrier, and a plurality of arcuate magnets disposed in spaced end-to-end relationship relative to one another in an annular array and fixedly embedded in said carrier, said carrier being continuous along its full circumference except for having a single axially extending gap passing completely therethrough and which gap is located within the space between two of said magnets, said gap having a double wedge shape with minimum thickness near the axial center of said ring so as to accommodate a wedge driven into said gap from either side of said ring.

2. A unitary self-sustaining magnet ring for use in a dynamo-electric machine and adapted to being secured to a surrounding supporting ring, said magnet ring comprising a non-magnetic annular carrier, and a plurality of magnets fixedly embedded therein, each of said magnets being elongated with two concentric radially inner and outer arcuate faces, two side faces and two end faces and said magnets being disposed in spaced end-to-end relationship relative to one another in a circular array, and said carrier having two parallel side rings between which said circular array of magnets is located, each of said side rings extending along and engaging the adjacent side faces of said magnets, and said carrier also having a plurality of axially extending ribs connecting said two side rings to one another, one of said ribs being located in each space between adjacent end faces of said magnets and each of said ribs engaging the magnet end faces between which it is disposed, said carrier having a single gap therein extending along one of said ribs, and said carrier being located entirely radially inwardly of said radially outer faces of the said magnets, said gap having a minimum width near the axial center of said carrier and increasing in width with distance in both axial directions away from said axial center.

3. An annular permanent magnet field means for use in a dynamo-electric machine, said field means comprising a magnet ring and a supporting ring of ferromagnetic material, said magnet ring being a single self-sustaining unit made up of a plurality of separate elongated permanent magnets disposed in spaced end-to-end relationship in a circular array and an annular carrier of non-magnetic material in which said magnets are fixedly embedded, sad magnets each having and inner arcuate face and an outer arcuate face, said carrier being continuous along its full circumference except for one axially extending gap located between the adjacent ends of two of said magnets, said magnet ring being received within said supporting ring, and means securing said magnet ring to said supporting ring, said magnet ring having a generally cylindrical outer face and said supporting ring having a generally cylindrical inwardly facing face directly adjacent and surrounding said outer face of said magnet ring, and said means securing said magnet ring to said supporting ring comprising a spreading element received in said gap and exerting a spreading force on the walls of said gap so as to tend to circumferentially expand said ring and thereby urge said outer face of said magnet ring tightly against said inner face of said supporting ring, said gap having a minimum width near the axial center of said carrier and increasing in width with distance in both axial directions away from said axial center, and said spreading element being a wedge wedged between the walls of said gap.

4. A unitary self-sustaining magnet ring for use in a dynamo-electric machine and adapted to being secured to a surrounding supporting ring, said magnet ring comprising a non-magnetic annular carrier, and a plurality of arcuate magnets disposed in spaced end-to-end relationship relative to one another in an annular array and fixedly embedded in said carrier, said carrier being continuous along its full circumference except for having a single axially extending gap passing completely therethrough and which gap is located within the space between two of said magnets, said gap having a wedge shape with a minimum thickness at one point along the length thereof so as to accommodate a wedge driven into said gap from one side of said ring.

5. A unitary self-sustaining magnet ring for use in a dynamo-electric machine and adapted to being secured to a surrounding supporting ring, said magnet ring comprising a non-magnetic annular carrier, and a plurality of magnets fixedly embedded therein, each of said magnets being elongated with two concentric radially inner and outer arcuate faces, two side faces and two end faces and said magnets being disposed in spaced end-to-end relationship relative to one another in a circular array, and said carrier having two parallel side rings between which said circular array of magnets is located, each of said side rings extending along and engaging the adjacent side faces of said magnets, and said carrier also having a plurality of axially extending ribs connecting said two side rings to one another, one of said ribs being located in each space between adjacent end faces of said magnets and each of said ribs engaging the magnet end faces between which it is disposed, said carrier having a single gap therein extending along one of said ribs, and said carrier being located entirely radially inwardly of said radially outer faces of the said magnets, said gap having a minimum width at one point along its length and increasing in width with distance in at least one axial direction away from said point of minimum width.

6. An annular permanent magnet field means for use in a dynamo-electric machine, said field means comprising a magnet ring and a supporting ring of ferromagnetic material, said magnet ring being of a single self-sustaining unit made up of a plurality of separate elongated permanent magnets disposed in spaced end-to-end relationship in a circular array and an annular carrier of non-magnetic material in which said magnets are fixedly embedded said magnets each having an inner arcuate face and an outer arcuate face, said carrier being continuous along its full circumference except for one axially extending gap located between the adjacent ends of two of said magnets, said magnet ring being received within said supporting ring, and means securing said magnet ring to said supporting ring, said magnet ring having a generally cylindrical outer face and said supporting ring having a generally cylindrical inwardly facing face directly adjacent and surrounding said outer face of said magnet ring, and said means securing said magnet ring to said supporting ring comprising a spreading element received in said gap and extending a spreading force on the walls of said gap so as to tend to circumferentially expand said ring and thereby urge said outer face of said magnet ring tightly against said inner face of said supporting ring, said gap having a minimum width at one point along its length and increasing in width with distance in at least one axial direction away from said point of minimum width, and said spreading element being a wedge wedged between the walls of said gap.

* * * * *